United States Patent [19]
Kranz et al.

[11] Patent Number: 5,728,488
[45] Date of Patent: Mar. 17, 1998

[54] HIGH-ENERGY BATTERY WITH A PLURALITY OF INDIVIDUAL CELLS

[75] Inventors: Herbert Kranz, Utting; Peter Catchpole, Ingolstadt; Robert Hoeppler, Karlskron, all of Germany

[73] Assignee: Bayerische Motoren Werke Aktiengesellschaft, Munich, Germany

[21] Appl. No.: 696,730

[22] Filed: Aug. 14, 1996

[30] Foreign Application Priority Data

Aug. 14, 1995 [DE] Germany .................. 195 29 880.2

[51] Int. Cl.[6] ................................................. H01M 2/02
[52] U.S. Cl. ................ 429/120; 429/137; 429/149; 429/152; 429/153; 429/159; 429/162
[58] Field of Search ................................ 429/120, 127, 429/149, 150, 151, 152, 153, 156, 158, 159, 162

[56] References Cited

U.S. PATENT DOCUMENTS

| 463,845 | 11/1891 | Crisp | 429/158 |
| 3,353,999 | 11/1967 | Osborn | 429/156 |
| 3,920,477 | 11/1975 | Alaburda | 429/162 |
| 3,953,239 | 4/1976 | Anderson . | |
| 5,015,545 | 5/1991 | Brooks | 429/99 |
| 5,298,347 | 3/1994 | Aksoy et al. | 429/159 |
| 5,436,089 | 7/1995 | Fedele | 429/156 |
| 5,585,204 | 12/1996 | Oshida et al. | 429/120 |

FOREIGN PATENT DOCUMENTS

| 0 305 880 | 3/1989 | European Pat. Off. . |
| 0 476 484 | 3/1992 | European Pat. Off. . |
| 1 671 751 | 9/1971 | Germany . |
| 34 45 191 | 3/1994 | Germany . |

Primary Examiner—Stephen Kalafut
Assistant Examiner—Carol Chaney
Attorney, Agent, or Firm—Evenson, McKeown, Edwards & Lenahan, P.L.L.C.

[57] ABSTRACT

In a high-energy battery with a plurality of individual cells, the individual cells have the shape of flat parallelepipeds. The parallelepipeds are arranged flush to form a flat battery body. The battery body is surrounded on its two wide sides by a liquid heat exchange medium.

18 Claims, 1 Drawing Sheet

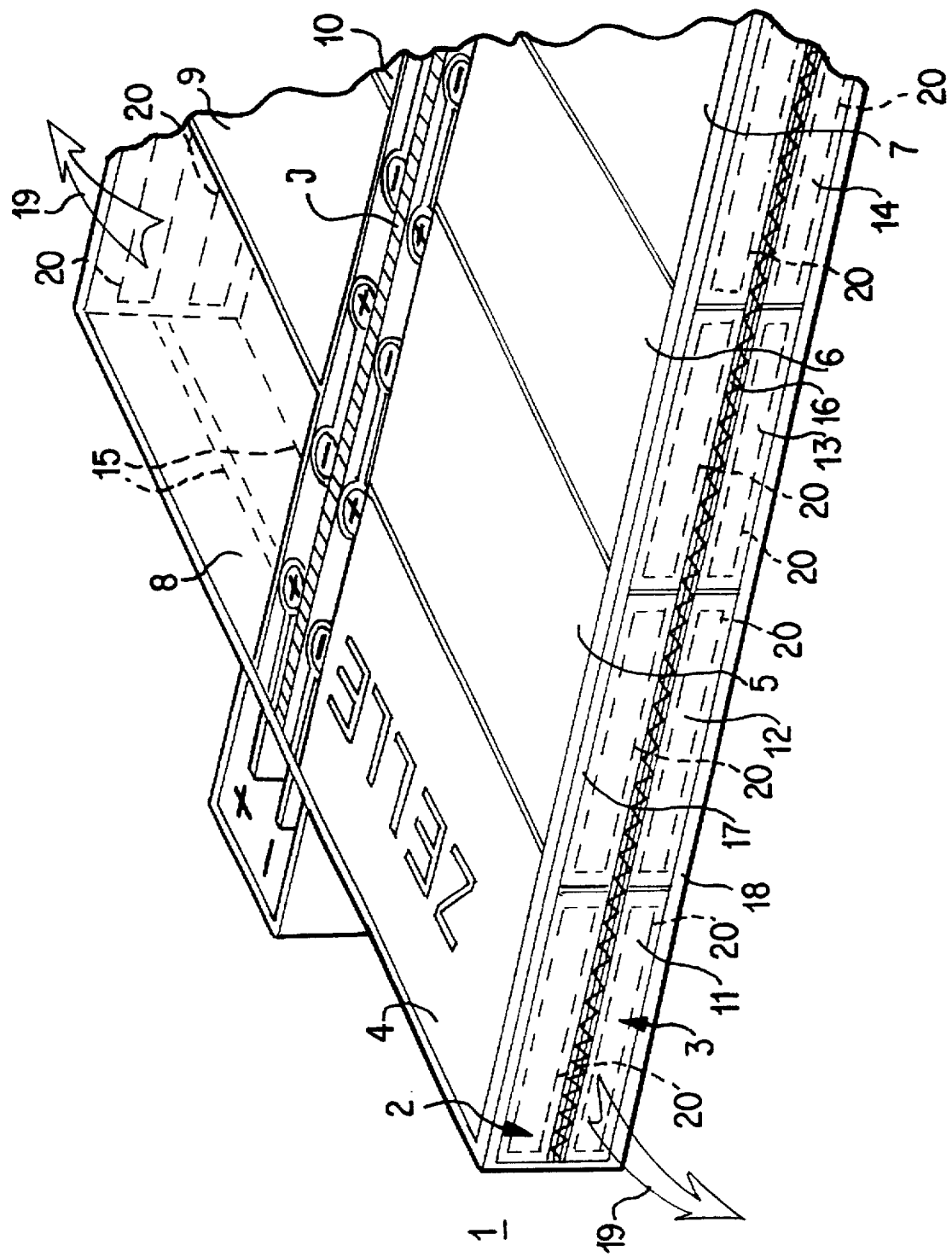

HIGH-ENERGY BATTERY WITH A PLURALITY OF INDIVIDUAL CELLS

BACKGROUND AND SUMMARY OF THE INVENTION

The invention relates to a high-energy battery having a plurality of individual cells.

A high-energy battery of the type having a plurality of individual cells is known in which the individual cells are cylindrical and are arranged to stand upright. This arrangement poses problems from the standpoint of heat, since different temperature gradients can develop within the individual cells and, for the most part, there is no way to influence the thermal behavior of such high-energy batteries from outside.

The goal of the invention is to provide a high-energy battery of the above-mentioned type which is characterized by a simple design that is simple in construction and poses no problems as far as heat is concerned.

The invention achieves this goal by providing a high-energy battery with a plurality of individual cells characterized in that the individual cells have the shape of flat parallelepipeds, said parallelepipeds being assembled flush against one another to form a flat battery body. The battery body is surrounded on its two wide sides by a heat exchange medium.

By providing heat exchangers on a large part of the total surface of the individual cells, it is possible to significantly influence the thermal properties of the individual cells and to unify the temperature level over the entire high-energy battery. The low height also permits the area of the automobile floor to serve as a mounting location in a motor vehicle. Consequently, the space that would otherwise be occupied by the high-energy battery in the vicinity of the trunk is freed.

In a preferred embodiment of the present invention, two such battery bodies are sandwiched together. This provides an improvement in the compactness and design of the high-energy battery.

In a further preferred embodiment, a heat exchange medium is provided in an intermediate layer and on exposed wide surfaces. This provides optimum temperature stabilization of the high-energy battery design.

It is an advantage of the present invention that the plurality of individual cells are arranged side-by-side having their long sides touching one another. This provides an additional increase in the number of individual cells without increasing the overall height of the high-energy battery.

Yet another advantage of the present invention provides a high-energy battery having two rows of individual cells having their ends facing one another. This allows a doubling of the number of individual cells while still retaining a flat design for the high-energy battery.

In yet another advantage of the present invention, the plurality of individual cells have a window arranged in their free ends. This makes it possible to view each individual cell from the exterior of the battery. Further, the windows can be provided with a score line. This gives the ability to prevent a chain reaction from occurring which would result in a pressure increase in the event of a defect in an individual one of the cells.

Other objects, advantages and novel features of the present invention will become apparent from the following detailed description of the invention when considered in conjunction with the accompanying drawings.

BRIEF DESCRIPTION OF THE DRAWING

The sole FIGURE is a perspective representation of a high-energy battery according to the present invention.

DETAILED DESCRIPTION OF THE DRAWING

The high-energy battery 1 consists of two layers 2 and 3 of individual cells 4 to 15. Each of the two layers 2, 3 consists of two rows of individual cells having their long sides arranged side by side and connected as shown (±). The two rows are located opposite one another to form a layer. Between the two layers is a heat exchange medium 16. There are also heat exchange media 17 and 18 on top of the upper layer 2 and beneath the bottom layer 3, respectively. This preferably liquid medium, oil for example, thus completely surrounds each of the individual cells up to the long and end sides. This makes it possible to heat or cool the high-energy battery as required. For this purpose, the cooling medium 17, 18 is circulated both in the cover layers and in the intermediate layer 16 by the counter-current principle. If the flow is included in the circuit of the vehicle air-conditioning system by the heat exchanger, which is required in any event, the cost of controlling the temperature of battery 1 and of the interior of the vehicle can be minimized.

For safety reasons, none of the individual cells 4–15 is completely surrounded by other individual cells. Each individual cell has at least one outwardly directed end. Windows 20 are located in these ends. The windows 20 are provided with scores, as indicated by the dashed lines. In the event of an accident, electrolyte that escapes after the window breaks can flow, under the influence of the pressure that builds up in the individual cells in question, out of the area where there is a danger of secondary short circuits. This is indicated by arrow 19.

The flat design of the high-energy battery 1 shown here is characterized by a homogeneous and hence improved temperature distribution over the entire battery. Heat diffusion pathways during temperature changes are short. This means shorter reaction times. The flat design also makes it possible to locate the batteries in the area beneath the floor of a motor vehicle, away from the crash zones and the trunk. Safety in accidents is increased as a result. In the event of an internal defect, a local safety measure is provided by the scores in the windows.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A high-energy battery, comprising:
   a plurality of individual cells, each of the individual cells having a flat parallelepiped shape including two flat surfaces spaced apart to define a thickness of said shape and peripheral edges extending between peripheries of said two flat surfaces, said parallelepiped shapes being assembled with said peripheral edges flush against one another; and
   a liquid heat exchange medium arranged to surround the two flat surfaces.

2. A high-energy battery, comprising:
   two flat battery bodies sandwiched together, each of said two flat battery bodies including a plurality of individual cells, each of the individual cells having a flat parallelepiped shape including two flat surfaces spaced apart to define a thickness of said shape and peripheral edges extending between peripheries of said two flat surfaces, said parallelepiped shapes being assembled with said peripheral edges flush against one another, said battery bodies being sandwiched together such that one of the flat surfaces of a first of the battery bodies faces one of the flat surfaces of a second of the battery bodies; and a liquid heat exchange medium arranged to surround the two flat battery bodies.

3. The high-energy battery according to claim 2, wherein a liquid heat exchange medium is provided in an intermediate layer between said one of the flat surfaces of said first of the battery bodies and said one of the flat surfaces of said second of the battery bodies.

4. The high-energy battery according to claim 1, wherein said peripheral edges of each of said individual cells include a parallel pair of first edges and a parallel pair of second edges, said second edges each extending between said pair of first edges, said first edges being longer than said second edges, said plurality of individual cells being arranged side-by-side with one of said first edges of each of said individual cells touching one of said first edges of an adjacent of said individual cells.

5. The high-energy battery according to claim 2, wherein said peripheral edges of each of said individual cells include a parallel pair of first edges and a parallel pair of second edges, said second edges each extending between said pair of first edges, said first edges being longer than said second edges, said plurality of individual cells being arranged side-by-side with one of said first edges of each of said individual cells touching one of said first edges of an adjacent of said individual cells.

6. The high-energy battery according to claim 4, wherein the plurality of individual cells are arranged in two rows with said second edges of one of the rows facing said second edges of the other of the rows.

7. The high-energy battery according to claim 5, wherein the plurality of individual cells are arranged in two rows with said second edges of one of the rows facing said second edges of the other of the rows.

8. The high-energy battery according to claim 1, wherein the plurality of individual cells each include a window on one of said peripheral edges facing the exterior of the battery.

9. The high-energy battery according to claim 2, wherein the plurality of individual cells each include a window on one of said peripheral edges facing the exterior of the battery.

10. The high-energy battery according to claim 8, wherein said windows are provided with a score line.

11. The high-energy battery according to claim 9, wherein said windows are provided with a score line.

12. The high-energy battery according to claim 1, wherein said two flat surfaces comprise a majority of the surface area of each of said individual cells.

13. A high-energy battery, comprising:

a plurality of individual cells, each of the individual cells including two surfaces spaced apart from each other to define a thickness of said cell and peripheral edges extending between peripheries of said two surfaces, said cells being arranged with said peripheral edges proximate one another; and a liquid heat exchange medium arranged to surround said two surfaces.

14. The high-energy battery according to claim 13, wherein said individual cells form a plurality of battery layers, said battery layers being sandwiched together such that one of the surfaces of the cells of each of said battery layers faces one of the surfaces of the cells of an adjacent of said battery layers.

15. The high-energy battery according to claim 14, further comprising a liquid heat exchange medium arranged in an intermediate layer between said facing surfaces of adjacent of the battery layers.

16. The high-energy battery according to claim 13, wherein the plurality of individual cells each include a window on one of said peripheral edges facing the exterior of the battery.

17. The high-energy battery according to claim 16, wherein said windows are provided with a score line.

18. The high-energy battery according to claim 13, wherein said two surfaces comprise a majority of the surface area of each of said individual cells.

* * * * *